United States Patent Office 3,350,537
Patented Oct. 31, 1967

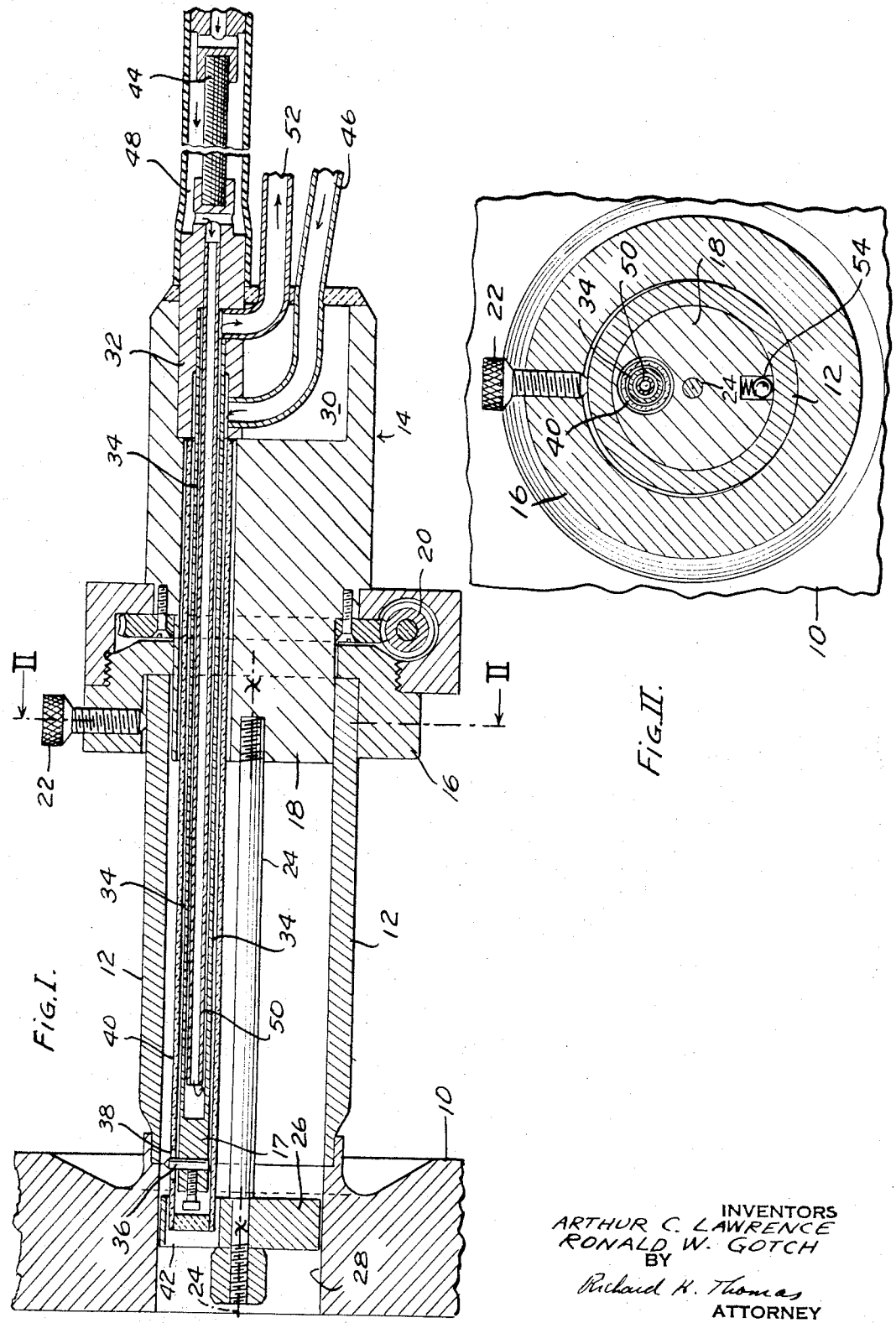

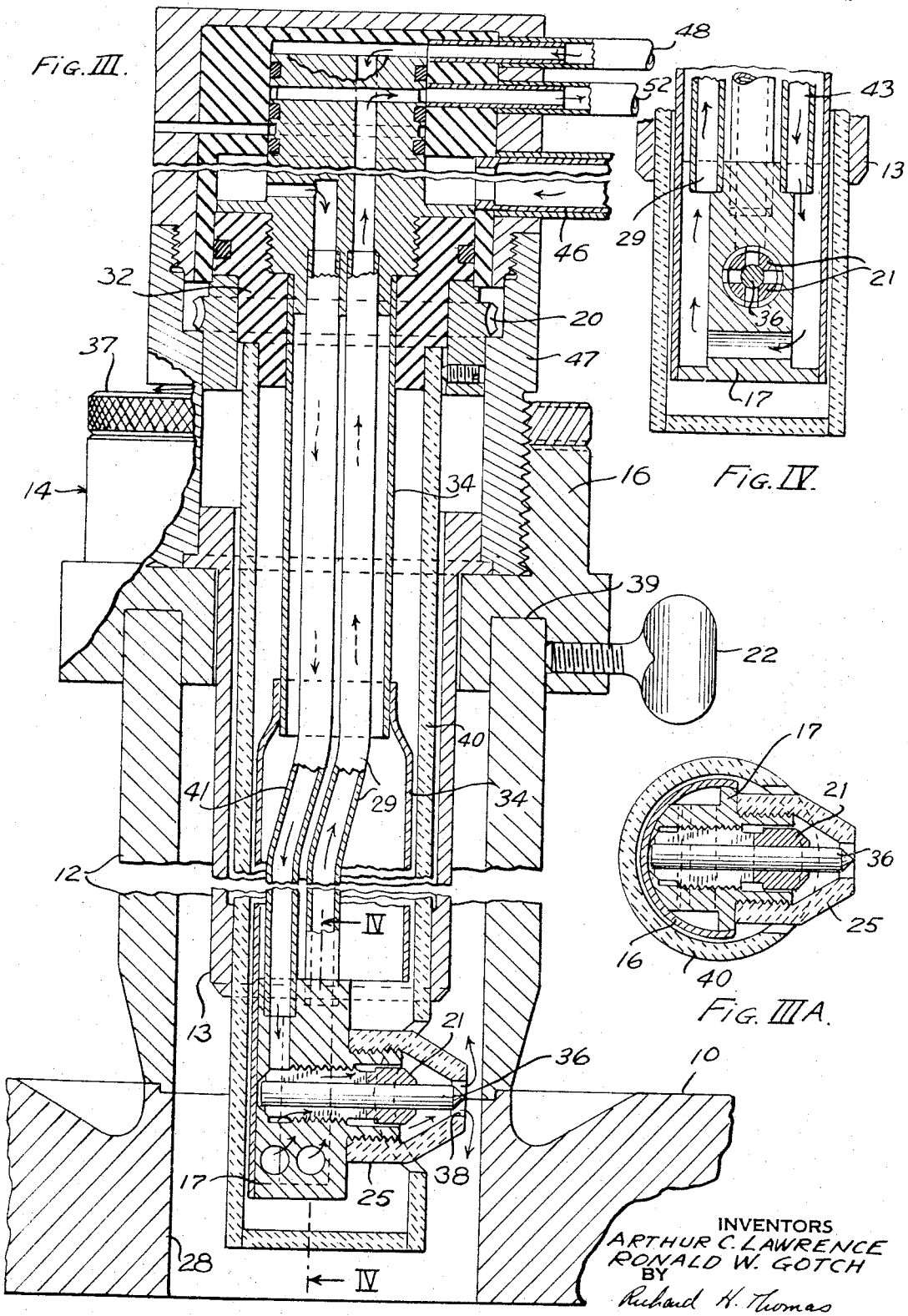
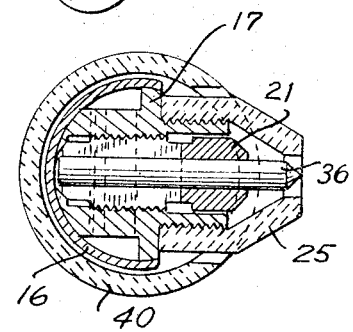

3,350,537
INTERNAL STUB TUBE WELDING APPARATUS
Arthur Charles Lawrence, East Molesey, Surrey, and Ronald William Gotch, Ashford, Middlesex, England, assignors to Foster Wheeler Corporation, New York, N.Y., a corporation of New York
Filed May 6, 1964, Ser. No. 365,349
10 Claims. (Cl. 219—125)

ABSTRACT OF THE DISCLOSURE

An inert gas shielded non-consumable electrode arc welding torch for internal welding of stub tubes to a surface in which an electrode protrudes radially for insertion into the bore of the tubes. The welding torch is provided with means adapted to engage the end of the tube for maintaining the torch parallel to the axis of the tube while the electrode is rotated around the tube bore.

When welding tubes to the headers or tube plates of boilers or heat exchangers, it frequently arises that a very large number of tubes have to be connected to one header or tube plate, and the tubes are so closely pitched that it is difficult to effect the welding from the outside of the tubes. In consequence, it has become usual, first of all, to weld short stub tubes to the header or tube plates and then internally butt weld the tubes to the stubs.

The present invention accomplishes efficient internal welding of such stubs having an inside diameter greater than one inch.

In accordance with the invention, there is provided for the welding of stub tubes to headers, an inner gas shielded electric arc welding torch having a non-consumable electrode which protrudes from a holder which can be inserted into the bore of the stub to be welded, the holder having for its support a pair of guide members adapted to be inserted one into the bore of the header or tube plate, and the other into the bore of the stub so as to maintain the holder with its axis parallel to that of the stub and enable an arc to be struck between the electrode and the junction of the stub and the header or tube plate and be maintained while the holder is orbited around the axis of the two bores.

The electrode holder and the guide member which is adapted to be inserted into the bore of the header or tube plate are carried by a rotary part mounted in the body of the torch. The guide member has its axis coincident with the axis of rotation of the rotary part as the holder has its axis parallel thereto. The body may be recessed to receive the outer end of the stub; and the rotary part may conveniently provide the guide member, which is adapted to be inserted into the bore of the stub.

As a further aspect to the present invention, provision is made for adjustment of the electrode to suit the diameter of tubes of varying nominal bores constituting an electrode holder which projects from and is mounted for rotation in the body of the torch and which is housed in an insulating shielding tube adapted to be inserted into the bore of one of the parts to be welded; an electrode and a shield therefor which project radially from the holder through an opening in the shielding tube; and a positioning member carried by the body for locating the electrode holder and the shielding tube with the said bore, the electrode and its shield and the positioning member being removable and replaceable by others to suit the diameter of the said bore.

When the torch is in use the shielding tube generally will be coaxial with the bore of the tube within which the torch is positioned; but in order to enable an electrode to be used which is of substantial length without unduly reducing the extent of its adjustment, the electrode holder or that part of it which carries the electrode can advantageously be off-set from the axis of the tube.

The welding effected with the torch will usually require the use of an inert gas such as argon for shielding the electrode and the fused metal against oxidation. An electrode shield may be provided in the form of an outlet nozzle closely surrounding the point of the electrode through which an inert shielding gas flowing through the body and the electrode holder can be supplied to the vicinity of the arc.

Water cooling means are provided for the electrode. This can be effected by securing the electrode to a block of material of high thermal conductivity and restricted length to and from which water is circulated through passages formed in the electrode holder.

The above and other advantages will appear more fully from the accompanying drawing wherein:

FIG. I is a sectional elevation of a torch shown in the welding position for welding tubes of the same nominal bore;

FIG. II is a section on a larger scale taken on the line II—II in FIG. I showing a modification;

FIG. III is a sectional elevation of a torch shown in welding position, for welding tubes of substantially different bores;

FIG. IIIA is a section taken along line IIIA—IIIA in FIG. III; and

FIG. IV is a sectional elevation of the outer end of the torch of FIG. III taken along line IV—IV.

Referring now to FIG. I which shows header or tube plate 10 to which is to be butt welded a tubular stub 12. The weld preparation of the two parts, although important in order that a good weld be made, forms no part of this invention and will not be particularly described. The drawings show the stub being welded to the header or tube plate from the inside by means of a gas shielded electrode welding torch 14. The torch has a stationary body part 16 in the form of a ring on which there is mounted a cylindrical block 18 arranged for rotation about the axis X—X of the body 16 by a worm drive 20 carried by that body. The body part 16 is recessed for receiving the outer end of the stub 12 which can be clamped into position by means of a screw 22 in the body.

The rotary block 18 carries a coaxial rod 24 which at its outer end carries a cylindrical guide plug 26 which can be inserted into the hole 28 in the header so as to be free for rotation therein. Projecting into a cavity 30 formed in the rear end of the rotary block 18 and arranged for rotation therewith, there is a support member 32 for a tube 34 of electrically conducting material which is plugged at its end remote from the support member and, at that end, carries a non-consumable electrode 36 projecting laterally from it through a hole 38 in a shielding tube 40 of ceramic material also carried by the support 32. The outer end of the shielding tube is plugged and is located in a hole 42 in the plug 26.

The axis of the tubes 34, 40 and 50 are displaced from, but parallel to the axis X—X of the rotary block 18 so that on rotation of the block the tubes and the electrode are caused to orbit around the axis. With the torch mounted as shown in FIG. 1, the electrode will make its orbital movement opposite the junction between the header 10 and the stub 12 where the weld is to be made. Electric current is supplied to the electrode 36 through supply cable 44 and support 32.

The inert gas used for shielding the arc and which will generally be argon is supplied through a conduit 46 and the annular space 41 between the electrode tube 34 and the shielding tube 40. The plug in the end of the tube 34 and the supporting plug 26 insure that the argon which is supplied to the vicinity of the arc cannot escape easily through the hole 28 in the header.

It is essential that the various parts of the torch be maintained cool for which purpose the torch is provided with a cooling water circulation system. Cooling water enters through a conduit 48 and first serves to keep the electric supply cable 44 cool. The water passes through a tube 50 carried by support 32 and located within the electrode tube 34. The outer end of the tube 50 is open and lies close to the end of the electrode tube where the welding heat is generated. The cooling water emerging from the tube 50 returns through the space between that tube and the electrode tube 34 to an outlet conduit 52.

The torch shown in FIG. 1 has been drawn horizontally. It can, however, be used vertically or at any intermediate angle. Vertical operation is preferable because it simplified the problem of supporting the torch.

Reference is now made to FIG. II. The rotary guide 18 for the electrode holder 34 is of a diameter materially smaller than that of the bore of the stub and the torch is steadied by providing the guide with spring pressed plungers 54 which may be in the form of balls or cylinders. This enables some degree of misalignment to be tolerated.

The torch described above is particularly suitable for use in welding tubes of fairly large diameter, for example, of from one to three and one half inches.

Referring to FIG. III and FIG. IIIA, there is shown an internal tube welding torch with an adjustable electrode to permit the torch to be used with tubes of different bore sizes. From the body portion 16 extends a metallic guard tube 13 which is mounted for rotation about its axis, and a ceramic shielding tube 40 which forms an insulating shield for an electrode holding block 17. The electrode holder which is of an electrically conducting material is tubular and is mounted for rotation with the shielding tube 40.

The lower end of the shielding tube 40 projects beyond the end of the guard tube 13 and is closed.

The electrode is in the form of a short rod 36 having a pointed end and is carried in a collett 21 which can be screwed into the electrode holder 17 so as to hold the electrode with its tip at a given adjustable distance from the holder. As shown, the electrode passes through a hole 38 in the wall of the shielding tube 40 so that its tip lies just beyond the outer surface of the guard tube.

The electrode is shielded by a ceramic shield 25 which is screwed on to a part of the electrode holder and which passes through the hole 38.

Within the electrode holder 17, there is a tube 41 which communicates at the upper end in the body of the torch with an inlet 46 for an inert gas such as argon. At the lower or outer end, the argon supply tube communicates with the space within the electrode shield 25 surrounding the electrode. The inert shielding gas is thus delivered to the region of the tip of the electrode where it is needed to enable a weld of good quality to be obtained.

Also within the electrode holder are a pair of tubes 43 and 29 which communicate at the upper end, in the body of the torch respectively, with an inlet 48 and an outlet 52 for water to keep the electrode reasonably cool. The water is carried by the tube 43 to the space below the electrode before being evacuated through the outlet 52.

FIG. III shows the torch in position for welding a stub tube 12 to a header 10. The torch is positioned by means of an adaptor sleeve guide member 47 which is screw-threaded on to the body of the torch 16 and can be locked in any position therealong by a locknut 37. The body of torch 16 has on its underface a groove 39 which, as shown, can be engaged over the end of the stub tube 12. The adaptor can be adjusted along the axis of the torch to bring the electrode accurately opposite the point at which the weld is to be made and can be replaced by a deeper or less deep adaptor if required. The adaptor can also be replaced by another adaptor having a centering groove 39 appropriate to any given tube size.

The mounting of the electrode 36 in the collett 21 enables it to be finely adjusted in and out to produce a welding gap of the required size. The electrode can also be removed and replaced by a shorter or longer one as required by the diameter of the tube to be welded. To remove it, the electrode shield 25 is first removed and can be replaced by another shield adapted to the length of the electrode. Thus, the weld is always well shielded by the inert gas which is delivered to the point at which it is most needed whatever may be the size of tube being welded.

It will be seen that the lower end of the electrode holder 17 to which the electrode is attached is out of axial alignment with the shield tube 40 which is in axial alignment with the tube 12 being welded. This is advantageous as it enables the shortest electrode to be of a length which makes it easier to handle.

For rotating the torch during the welding, the body of the torch houses a worm drive 20 through which the guard tube 13, the shielding tube 40 and the electrode holder 34 are rotated as a whole.

It will be understood by those skilled in the art that changes in the details of this torch apparatus may be made without departing from the invention as defined in the appended claims.

What is claimed is:

1. An inert gas shielded non-consumable electrode arc welding torch for internal welding of stub tubes to a surface, the stub tubes having a first end to be welded and a distal end remote from said first end, comprising, a body portion of the torch, an elongated electrode holder mounted in the body portion of the torch having a free end extending from the body portion, an elongated insulating shield tube, the electrode holder free end housed in the shield tube, said shield tube adapted to be inserted into the bore of the stub tube to be welded and having an opening therein, an electrode protruding radially from the holder through the opening in the shield tube, the torch further including guide means adapted to engage the distal end of the stub tube to maintain the holder with its axis parallel to the stub tube, the guide means having at least an insert portion adapted to be inserted within the bore of the stub tube of approximately the same diameter as the stub tube bore, means permitting rotation of the holder relative to the guide means.

2. A torch according to claim 1 comprising a bore guide member operatively associated with said guide means positioned on a side of the electrode opposite from the guide means so that the electrode holder may be orbited coaxially with or about the axis of the tube bore.

3. A torch according to claim 2 further comprising a rotary part mounted in the body of the torch for carrying the holder and the bore guide member, said bore guide member having its axis coincident with the axis of rotation of the rotary part and said holder having its axis parallel and in spaced relationship thereto.

4. A torch according to claim 3 wherein the guide means is in the form of a recess adapted to receive the distal end of the stub tube.

5. A torch according to claim 4 in which the rotary part provides the tube guide member insert portion.

6. A torch according to claim 2 in which the diameter of at least one guide member is substantially smaller than the diameter of the bore into which it is to be inserted, further comprising plungers associated with each guide member, said plungers radially urged outwards by springs so as to contact the bore for compensating for misalignment between the bore of the stub and the bore of the part to which the stub tube is to be welded.

7. A torch according to claim 1 comprising an electrode shield projecting radially from the holder through said opening in the shield tube, an adaptor positioning member carried by the body for locating the electrode holder and the shield tube longitudinally within the tube bore, the electrode, the electrode shield, guide means and the adaptor positioning member being removable and replaceable by others to suit the diameter of the said bore.

8. A welding torch according to claim 7 whereby the electrode holder is off-set from the axis of the stub tube.

9. A welding torch according to claim 7, wherein the electrode holder is hollow having a bore, further including means to supply an inert gas to the electrode holder bore, the electrode shield forming an opening closely surrounding the point of the electrode, means communicating the electrode shield opening with the electrode holder bore by which an inert gas flowing through the electrode holder can be supplied to the vicinity of the electrode arc.

10. A welding torch according to claim 7 including means mounting the electrode on the electrode holder for fine radial adjustment.

References Cited

UNITED STATES PATENTS

| | | | |
|---|---|---|---|
| 2,868,953 | 1/1959 | Gardner | 219—125 |
| 3,084,243 | 4/1963 | Gotch | 219—125 |
| 3,125,670 | 3/1964 | Hawthorne | 219—125 |
| 3,142,745 | 7/1964 | Gotch | 219—125 |

FOREIGN PATENTS

| | | | |
|---|---|---|---|
| 1,355,424 | 2/1964 | France | 219—125 |
| 1,362,270 | 4/1964 | France | 219—125 |

RICHARD M. WOOD, *Primary Examiner.*

J. V. TRUHE, *Examiner.*